US006766876B2

(12) United States Patent
Ozeki et al.

(10) Patent No.: US 6,766,876 B2
(45) Date of Patent: Jul. 27, 2004

(54) REAR WHEEL SUSPENSION SYSTEM IN VEHICLE

(75) Inventors: Takashi Ozeki, Saitama (JP); Shinji Takayanagi, Saitama (JP); Hiroyoshi Kobayashi, Saitama (JP); Shinji Furuta, Saitama (JP); Takuya Tagami, Saitama (JP); Hirosi Takamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 219 days.

(21) Appl. No.: 09/955,104

(22) Filed: Sep. 19, 2001

(65) Prior Publication Data

US 2002/0163154 A1 Nov. 7, 2002

(30) Foreign Application Priority Data

Sep. 19, 2000 (JP) ........................................ 2000-284212

(51) Int. Cl.[7] .............................................. B62D 21/00
(52) U.S. Cl. ..................... 180/311; 180/210; 180/215; 280/400; 280/483; 280/124.103; 280/124.711; 280/124.133
(58) Field of Search ................................ 180/210, 215, 180/216, 311; 280/400, 483, 124.103, 124.111, FOR 131, FOR 33

(56) References Cited

U.S. PATENT DOCUMENTS 4,749,205 A 6/1988 Takahashi et al.

FOREIGN PATENT DOCUMENTS

| EP | 17480 | * 10/1980 | ........ 280/FOR 133 |
| GB | 2116497 | * 9/1983 | ................. 180/215 |
| JP | 2-158482 | * 6/1990 | ................. 180/210 |
| JP | 3-153484 | * 7/1991 | ........ 280/FOR 133 |
| JP | 5-39073 | 2/1993 | |

OTHER PUBLICATIONS

Patent Abstracts of Japan, M–1433, Jun. 21, 1993, vol. 17, No. 324 (abstract of JP 05 039073 A).

* cited by examiner

*Primary Examiner*—Eric Culbreth
(74) *Attorney, Agent, or Firm*—Birch, Stewart, Kolasch & Birch, LLP (57) ABSTRACT

A rear wheel suspension system for a four-wheeled vehicle suitable for attaining vehicle weight reduction, setting weight distribution of the vehicle, improving vehicle design freedom, and decreasing the number of components as compared to conventional rear wheel suspension systems. The system includes a joint member mounted in a rear portion of a vehicle body with a pair of left and right front wheels secured thereto, the joint member including a roll shaft extending substantially in the longitudinal direction of the vehicle body, and connecting to a vertical swing shaft extending in the transverse direction of the vehicle body. In addition, a power unit for supporting the two rear wheels is connected to a rear portion of the joint member by means of the vertical swing shaft, thereby allowing the power unit to be secured to the vehicle body rollably and swingably.

13 Claims, 9 Drawing Sheets

REAR WHEEL SUSPENSION SYSTEM IN VEHICLE

BACKGROUND OF THE INVENTION

1. Field of the Invention

The present invention relates to a rear wheel suspension system in a vehicle suitable for attaining a reduction in weight of the vehicle and for increasing the degree of freedom in design and simplicity in construction.

2. Description of Background Art

As a rear wheel suspension system in a vehicle wherein a rear wheel axle side is secured to a rear portion of a vehicle body rollably through a roll shaft extending in the longitudinal direction of a vehicle body and vertically swingably through a swing shaft extending in the transverse direction of the vehicle body, and rear wheels are secured to a rear wheel axle, there is known, for example, a suspension system disclosed in Japanese Patent Laid-open No. Hei 5-39073 entitled "Swing Type Vehicle."

FIGS. 10(A) to 10(C) of the above publication illustrate a swing type vehicle wherein a pair of right and left front wheels Wf, which are steered with a bar handle 2, are secured to a front portion of a body frame 1, a swing shaft 4 extending substantially FIGS. 10(A) to 10(C) of the above publication illustrate a swing type vehicle wherein a pair of right and left front wheels Wf, which are steered with a bar handle 2, are secured to a front portion of a body frame 1, a swing shaft 4 extending substantially horizontally in the longitudinal direction of the vehicle body is provided in a rear portion of the body frame 1, a battery supporting frame 9 is coupled to a second swing shaft 75 which is coaxial with the swing shaft 4, a power unit P is connected to the swing shaft 4 through a swing joint 6, rear wheels Wr are secured to both ends of an output shaft of the power unit P, and a rear end of the battery supporting frame 9 and both right and left ends of the power unit P are connected together using two restriction rods 74R and 74L.

When the vehicle turns during high-speed travel, a large centrifugal force acts on the battery supporting frame 9 outwards with respect to the turning direction, so that with this centrifugal force the battery supporting frame 9 tilts outwards with respect to the turning direction, centered at the second swing shaft 75. With this tilting motion, a rear portion of the power unit P moves into the same direction as the direction where the centrifugal force acts, i.e., moves outwards with respect to the turning direction by the restriction rods 74R and 74L. Consequently, the power unit P tilts outwards with respect to the turning direction, centered at the swing joint 6, and the rear wheels Wr are steered inwards with respect to the turning direction, i.e., in the same direction as the front wheels Wf.

According to the above technique, the rear wheels are steered in the same direction as the turning direction (steering direction of the front wheels) with the centrifugal force acting on the battery supporting frame 9, a heavy object, with a battery 10 mounted thereon. Due to the necessity of mounting the heavy object on the rear portion of the vehicle body, it is difficult to attain the reduction in weight of the vehicle body and the degree of freedom in weight distribution is limited. Further, it is necessary to use the restriction rods 74R, 74L and connecting members such as ball joints attached to end portions of those restriction rods, resulting in that the number of components used increases and the manufacturing cost becomes high.

SUMMARY AND OBJECTS OF THE INVENTION

It is an object of the present invention to provide a rear wheel suspension system in a vehicle capable of reducing vehicle weight easily, increasing the freedom of vehicle design, and simplifying vehicle construction.

For achieving the above-mentioned object a vehicle with a pair of front and rear wheels is provided with a rear wheel suspension system connected to a joint member mounted in a rear portion of the vehicle body. The joint member includes a roll shaft extending substantially in the longitudinal direction of the vehicle body. The roll shaft is mounted so that a front end portion thereof is positioned lower than its rear end portion. Also provided is a vertical swing shaft extending in the transverse direction of the vehicle body, and a rear wheel support member for supporting rear wheels is connected to a rear portion of the joint member, thereby allowing the rear wheel support member to be secured to the vehicle body rollably and swingably.

Since it is not necessary to mount a heavy object on a rear portion of the vehicle body, it is possible to easily reduce the weight of the vehicle. In addition, the vehicle weight distribution can be set freely, and the degree of freedom for vehicle design can be improved. Further, rods for steering rear wheels and rod connecting members, as in the prior art, are no longer required. Thus, it is possible to simplify the construction of the rear wheel suspension system and to reduce the number of components used therein.

The joint member is provided with a bearing for supporting the roll shaft, and a damper is disposed between the roll shaft and the bearing. Since a damper is disposed between the roll shaft and the bearing, it is possible to easily adjust the rolling rigidity of the vehicle body and rear wheel steering characteristic, thus improving vehicle drivability.

The rear wheel support member can be combined with the vehicle drive source using the rear wheel axle as an output shaft. Further, the vehicle drive source, such as an engine or an electric motor, can also be combined with the rear swing arm, making it possible to reduce the number of components used and reduce the vehicle manufacturing cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
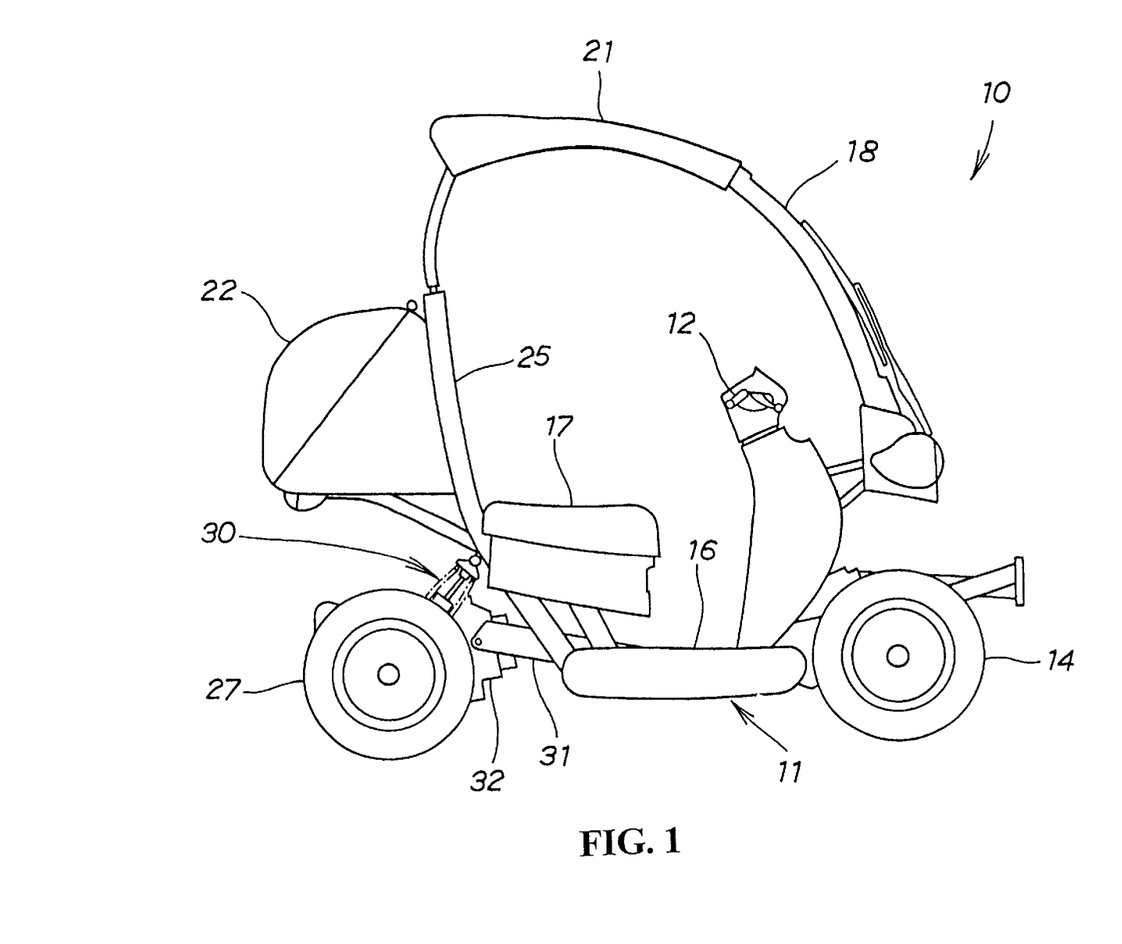
FIG. 1 is a side view of a vehicle equipped with a rear wheel suspension system embodying the present invention.

FIG. 1 is a side view of a vehicle equipped with a rear wheel suspension system embodying the present invention. The vehicle is a four-wheeled vehicle 10, and includes a pair of left and right front wheels 13, 14 (the inner-side numeral 13 is not shown) to be steered with a bar handle 12 secured rotatably to a front portion of a vehicle body 11, while a rear suspension system 30 embodying the present invention is mounted to a rear portion of the vehicle body 11. Other elements include floor step 16 for a driver of the vehicle to put his or her feet thereon, a seat 17, a windscreen 18, a roof 21, and luggage box 22.

Figure 2:
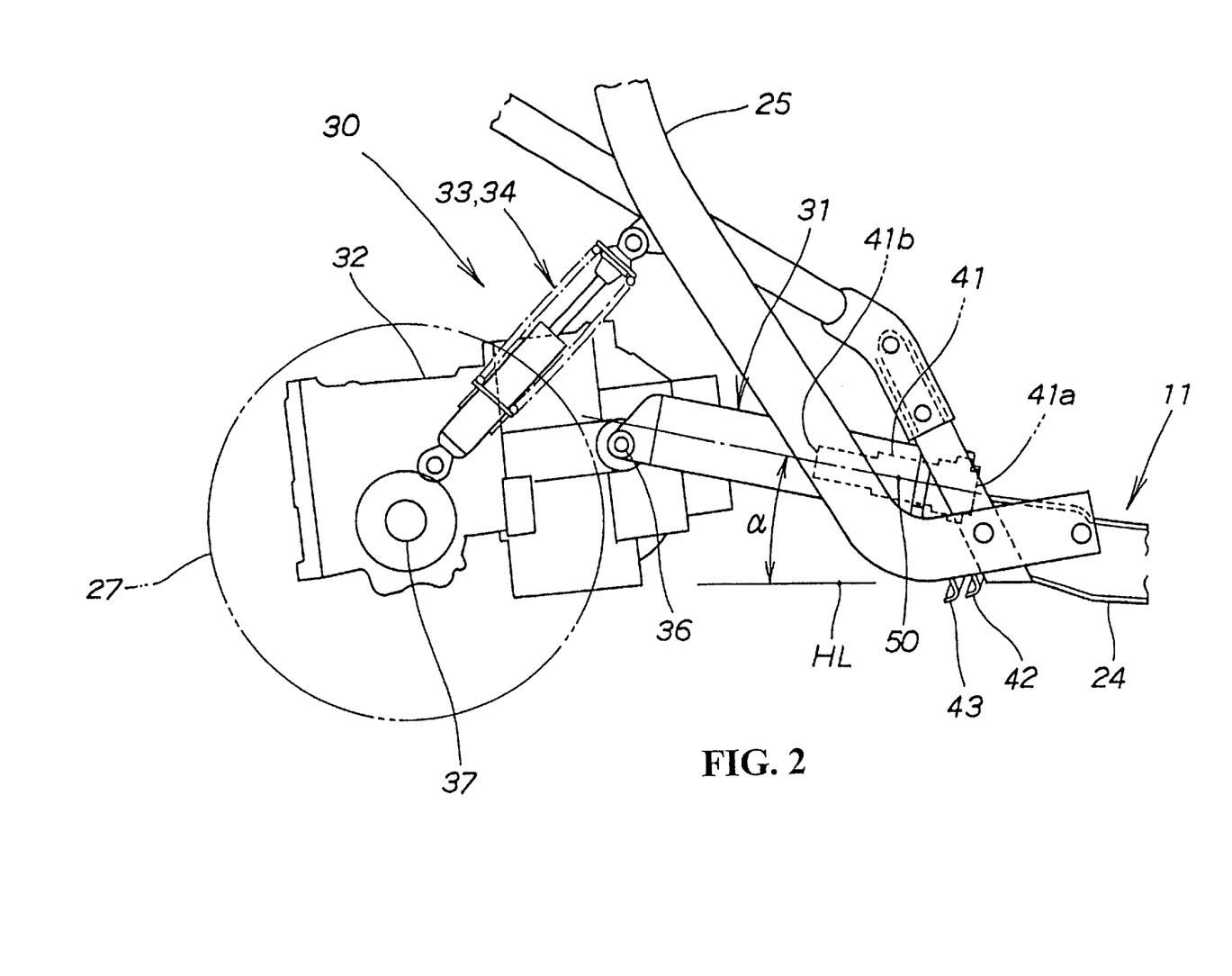
FIG. 2 is a side view of the rear wheel suspension system.

FIG. 2 is a side view of the rear wheel suspension system according to the present invention. The rear wheel suspension system 30 comprises a joint member 31 attached to a rear portion of a body frame 24 of the vehicle body 11 and a power unit 32 including an engine and a power transfer unit combined with the rear wheel support member, the combined unit being connected to a rear end of the joint member 31 vertically swingably. Two rear shock absorbers units 33 and 34 (the inner-side reference numeral 33 is not shown) are mounted between the power unit 32 and the vehicle body 11 (more specifically a pole 25 secured in the body frame 24). A vertical swing shaft 36 extends in the transverse direction of the body vehicle, the vertical swing shaft enabling the power unit 32 to swing vertically. The power unit 32 has an output shaft 37 on which are mounted a pair of left and right rear wheels 26, 27 (the inner-side numeral 26 is not shown).

Figure 3:
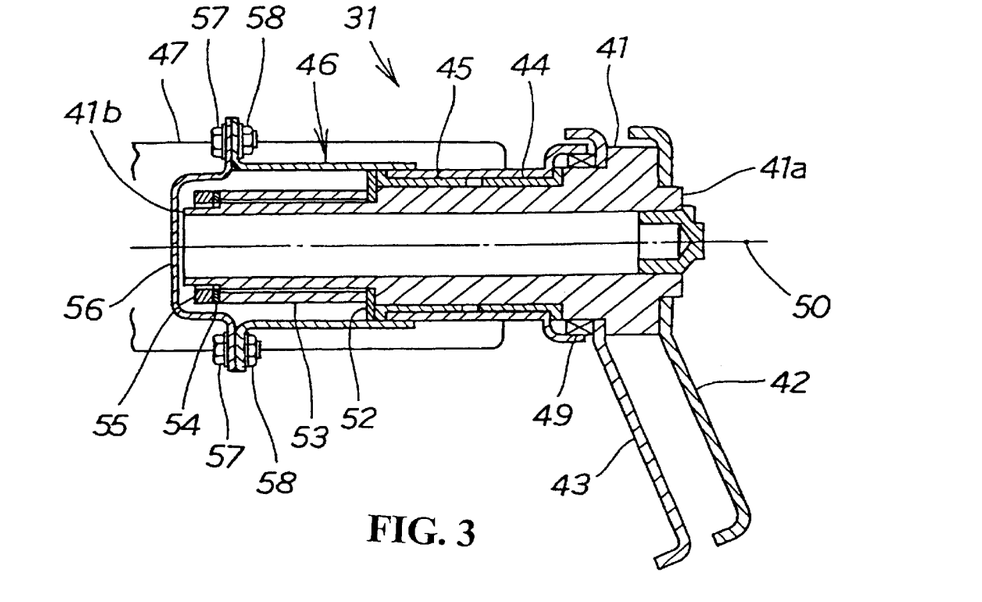
FIG. 3 is a sectional view of a joint member used in the rear wheel suspension system.

FIG. 3 is a sectional view of the joint member used in the rear suspension system according to the present invention. The joint member 31 comprises a roll shaft 41 shown in FIG. 3 extending substantially in the longitudinal direction of the vehicle body for mounting the power unit 32 and the rear wheels 26, 27 rollably to the vehicle body 11 shown in FIG. 2. Flanges 42 and 43 are attached to a front end portion of the roll shaft 41 to attach the joint member 31 to the body frame 24 (see FIGS. 5(a) and (c)). An outer case 46 is provided as a bearing which supports the roll shaft 41 rotatably through bushings 44 and 45, and arms 47 and 48 (see FIGS. 3 and 4) are secured to the outer case 46. A front end portion 41a and a rear end portion 41b are provided on roll shaft 46, with an oil seal 49 disposed there between.

An axis 50 is provided for the roll shaft 41. The present invention is characterized in that the roll shaft 41 is secured to the vehicle body 11 (see FIG. 2) through flanges 42 and 43 in such a manner that the front end portion 41 a of the roll shaft 41 is tilted lower than the rear end portion 41b. In FIG. 2, the angle between a horizontal line HL and the axis 50, i.e., an inclination angle of the axis 50, is assumed to be α.

In the roll shaft 41, a washer 52 is abutted against an end face of the bushing 45, one end of a collar 53 is abutted against the washer 52, and a nut 55 is disposed at the opposite end of the collar 53 through a washer 54. The nut 55 is threadedly engaged with the end portion of the roll shaft 41 to prevent dislodgment of the roll shaft 41 from the outer case 46. A lid 56 is fixed to the outer case 46 with bolts 57 and nuts 58.

Figure 4:
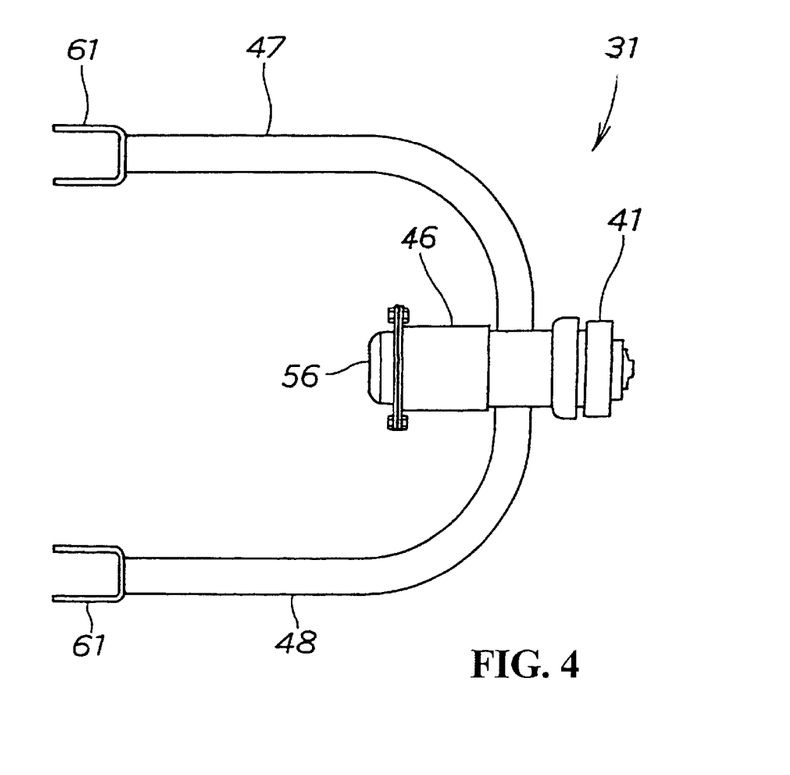
FIG. 4 is a plan view of the joint member.

FIG. 4 is a plan view of the joint member according to the present invention. Arms 47 and 48 extend sideways and backwards from an outer surface of the outer case 46 of the joint member 31 and brackets 61 for mounting the power unit 32 (see FIG. 2) are attached to rear ends of the arms 47 and 48, respectively.

As described above in connection with FIG. 2, the rear wheel support member is combined with the power unit 32 which uses the axle of the rear wheels 26 and 27 as the output shaft 37. The power unit 32 is also combined with a rear swing arm, making it possible to reduce the number of components and hence reduce manufacturing cost.

Figure 5A:
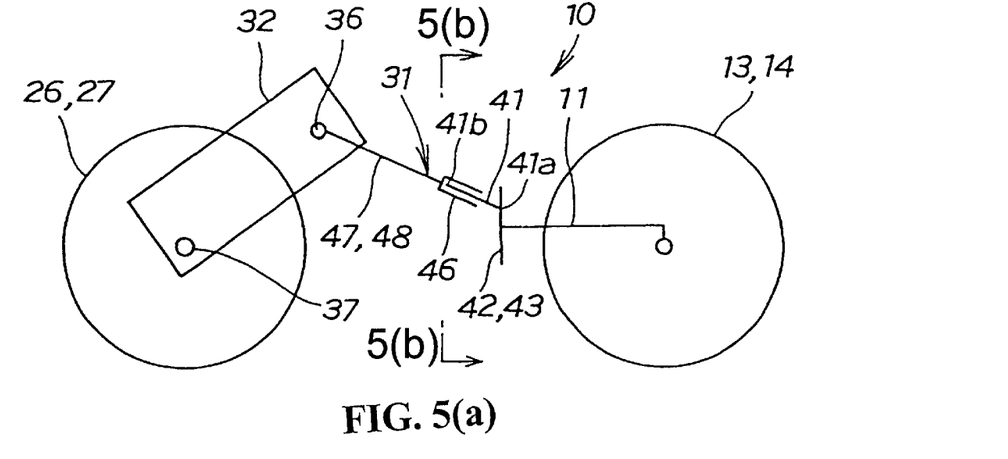
FIGS. 5(a)–(c) are schematic diagrams showing a vehicle related to the present invention.
Figure 5B:
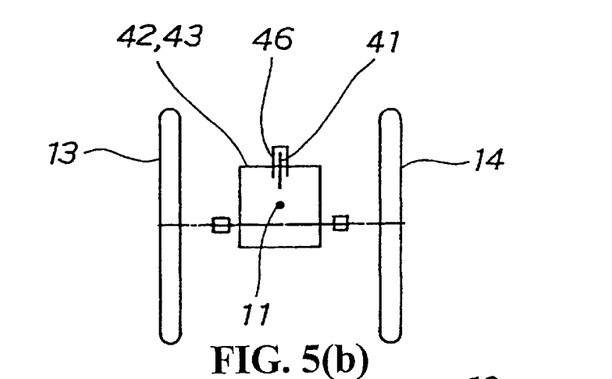
Figure 5C:
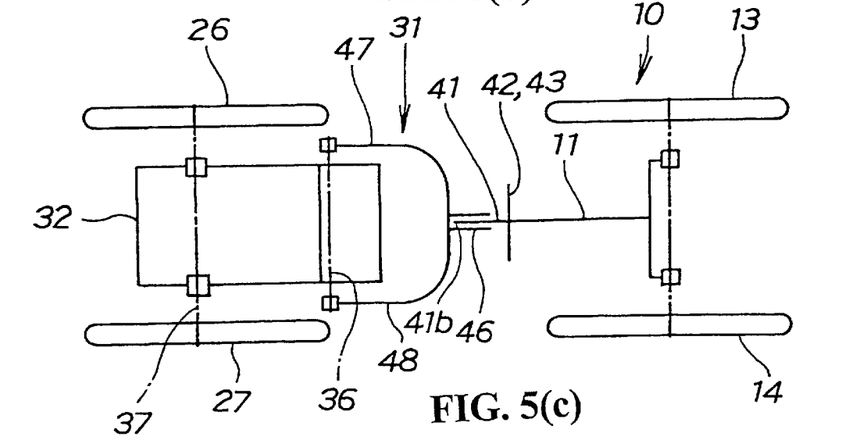

FIGS. 5(a) to 5(c) are schematic diagrams illustrating the vehicle related to the present invention. In FIG. 5(a), which schematically illustrates a side face of the four-wheeled vehicle 10, the front wheels 13 and 14 are secured to the vehicle body 11, and the flanges 42 and 43 of the joint member 31 are secured to the rear portion of the vehicle body 11. The roll shaft 41 is secured to the flanges 42 and 43 in such a manner that its front end portion 41a is positioned lower than its rear end portion 41b. The roll shaft 41 is supported rotatably by the outer case 46, the arms 47 and 48 are attached to the outer case 46, and the power unit 32 is mounted to the arms 47 and 48 swingably. The rear wheels 26 and 27 are mounted on the output shaft 37 of the power unit 32. FIG. 5(b) is a sectional view taken on line b—b in FIG. 5(a) and FIG. 5(c) is a plan view of FIG. 5(a).

Figure 6A:
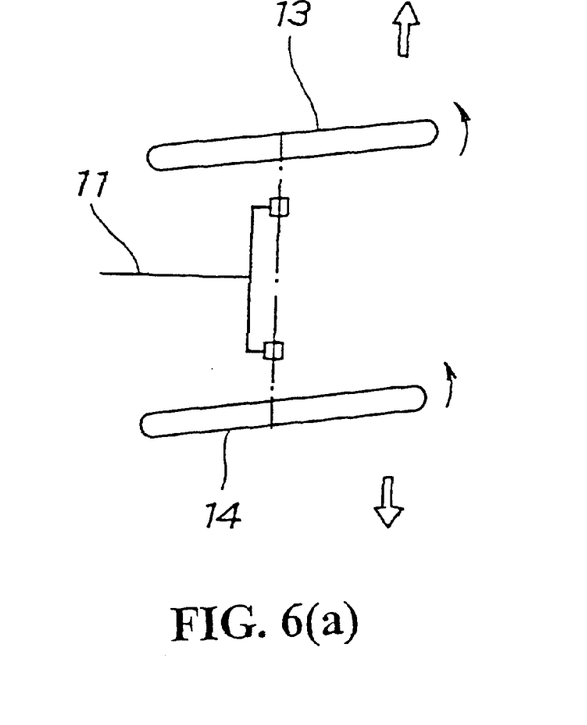
FIGS. 6(a) and (b) are first operation diagrams for explaining the operation of the rear wheel suspension system.
Figure 6B:
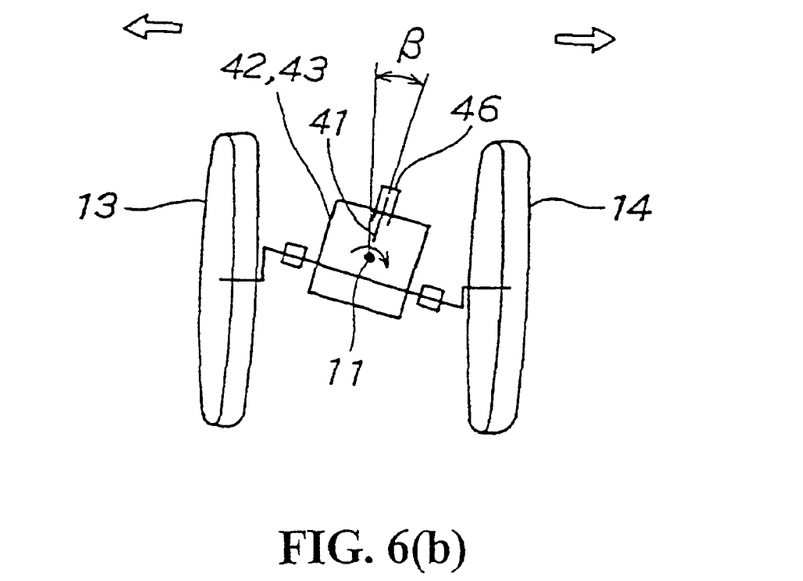

Next, the operation of the rear wheel suspension system 30 constructed as above will be described. FIGS. 6(a) and 6(b) are diagrams explaining the operation of the rear wheel suspension system according to the present invention. FIG. 6(a) shows the four-wheeled vehicle running at high speed, with the bar handle turned left causing the front wheels 13 and 14 to steer to the left. In FIG. 6(b), as the front wheels 13 and 14 are steered to the left, the vehicle body 11 rolls at a rolling angle of , clockwise as indicated with arrow. This causes the roll shaft 41, the outer case 46 and the flanges 42 and 43 to tilt to the right, opposite to the steered direction of the front wheels 13 and 14.

Figure 7A:
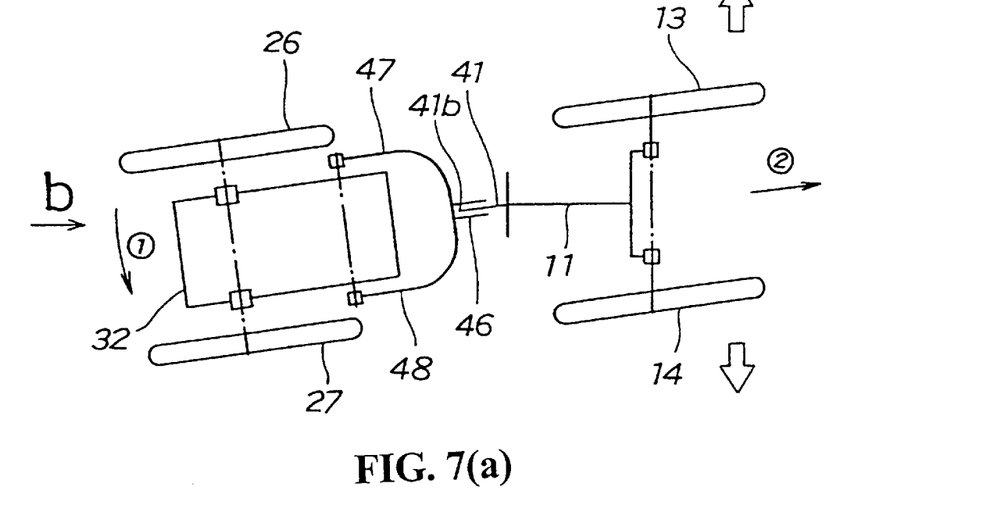
FIGS. 7(a)–(c) are second operation diagrams for explaining the operation of the rear wheel suspension system.
Figure 7B:
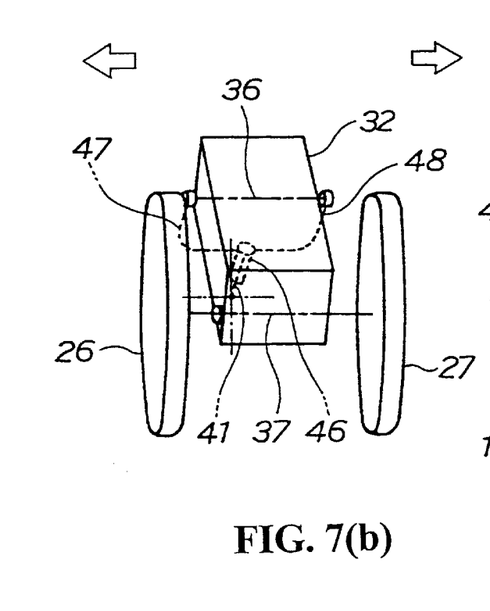
Figure 7C:
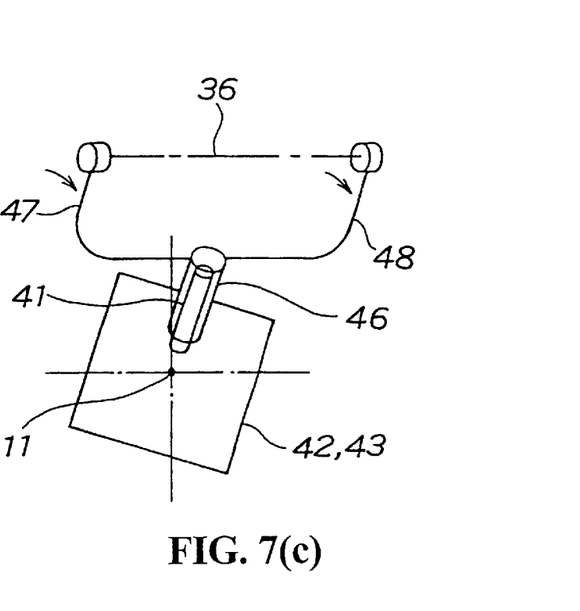

FIGS. 7(a) to 7(c) are additional diagrams explaining the operation of the rear wheel suspension system according to the present invention. FIG. 7(a) is a plan view, FIG. 7(b) is a view as seen in the direction of arrow b, and FIG. 7(c) is an enlarged view of a principal portion (with flanges 42 and 43 added) of FIG. 7(b). In FIG. 7(a), as the roll shaft 41 rotates to the right, with inclination angle α (see FIG. 2), the rear end portion 41b of the roll shaft 41 rotates to the right, opposite to the steering direction.

As a result, the roll shaft 41, as well as the outer case 46 and the arms 47 and 48, rotate relatively with respect to each other (actually, as will be described below in connection with FIGS. 7(b) and 7(c), the rotation of the outer case 46 and the arms 47, 48 is less than the rotation of the roll shaft 41). The rightward movement of the rear end portion 41b of the roll shaft 41, causes the rear portions of the arms 47 and 48 attached to the outer case 46 move rightwards, which in turn causes the rear portion of the power unit 32 and rear portions of the rear wheels 26 and 27 to move rightwards as indicated with arrow î. Thus, the rear wheels 26 and 27 can be steered leftwards, that is, in the same direction as that of the front wheels 13 and 14.

In FIG. 7(b), since the rear wheels 26 and 27 are mounted directly on the output shaft of the power unit 32, the power unit only rolls by a small amount even if the front wheels are steered and turned. Thus the outer case 46 and the arms 47, 48 only rotate a small amount also.

In FIG. 7(c), since the roll shaft 41 rotates with rolling of the vehicle body 11, while the outer case 46 rotates a smaller amount, there is a relative rotation between the roll shaft 41 and the outer case 46. Further, since the rear end portion of 41b of the roll shaft 41 descends with rotation of the roll shaft 41, the rear portions of the arms 47 and 48 connected to the outer case 46 also descend, as indicated by the arrows in FIG. 7(c).

Thus, in FIG. 7(a), the vehicle body 11 advances in the direction of arrow 2 and is steered by the front wheels 13 and 14. The rolling that occurs at the time of turning is diminished. Thus, the stability and posture of the vehicle body 11 are more easily controlled. Also, when the front wheels 13 and 14 are steered for example to the right, the rear wheels 26 and 27 steer in the same direction as that of the front wheels, that is, to the right.

As described above in connection with FIGS. 2, 3, and 5(c), the power unit 32 which support the rear wheels 26 and 27 is connected to a rear portion of the joint member 31, thereby allowing the power unit 32 to be secured to the vehicle body 11 rollably and swingably. Again, the roll shaft 41 is mounted in a tilted state wherein the front end portion 41a of the roll shaft 41 is lower than the rear end portion 41b of the roll shaft.

According to the above construction, since it is not necessary to mount a heavy object on the rear portion of the vehicle body, it is possible to reduce the vehicle weight, and it is possible to freely distribute the weight of the vehicle. Hence, it is possible to improve the design freedom of the vehicle. Moreover, restriction rods for steering the rear wheels and connecting members for the restriction rods, as in the prior art, are no longer necessary. Thus the construction of the rear wheel suspension system is simple, and the number of components thereof is decreased. This in turn decreases the manufacturing cost of the vehicle.

Unlike conventional configurations which rely on a centrifugal force acting on a heavy object mounted to the rear portion of the vehicle body, with the present invention the rear wheels 26 and 27 can be steered in accordance with a rolling angle of the vehicle body 11. Since the rear wheels 26 and 27 can be steered in the same direction as a steered direction of the front wheels 13 and 14, it is possible to improve the steering stability and maintain proper posture of the vehicle body while traveling at high speeds.

In the rear wheel steering structure according to the present invention, the steering angle of the rear wheels 26 and 27 can be changed by changing the inclination angle α (see FIG. 2) of the roll shaft 41. Thus, if the inclination angle α is made negative (that is, if the front end portion 41a of the roll shaft 41 is raised higher than the rear end portion 41b to tilt the roll shaft 41), the rear wheels 26 and 27 can be steered in a direction opposite to a steered direction of the front wheels 13 and 14. Thus, the rear wheel steering structure is a simple mechanical structure, making it possible to reduce the manufacturing cost in comparison with that of a complicated electronically controlled type structure.

Figure 8:
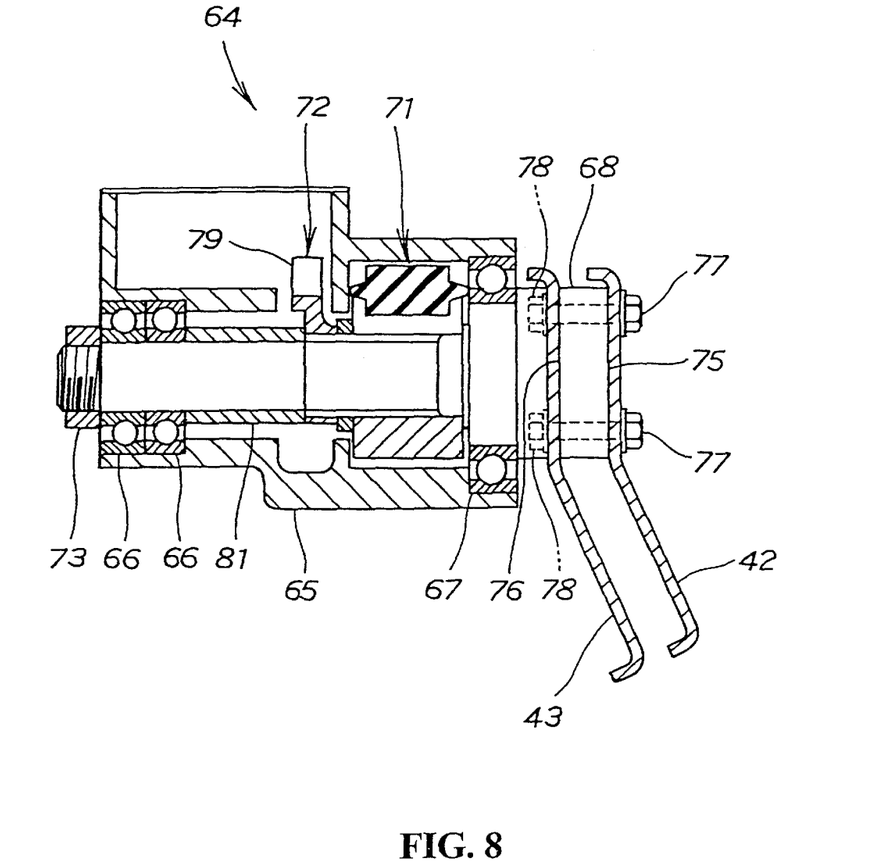
FIG. 8 is a sectional view of a joint member in a rear wheel suspension system according to another embodiment of the present invention.

FIG. 8 is a sectional view of a rear suspension system using a joint member according to another embodiment of the present invention. As in the previous embodiment described in FIG. 3, components will be identified by the same reference numerals, and thus explanations thereof will be omitted. A joint member 64 comprises a case body 65, a roll shaft 68 inserted into the case body 65 rotatably through a pair of bearings 66 and a bearing 67. Flanges 42 and 43 are secured to a front portion of the roll shaft 68. A damper 71 is interposed between the case body 65 and the roll shaft 68. A roll locking mechanism 72 is provided which will be described in detail later. A nut 73 is provided for preventing dislodgment of the roll shaft 68.

The case body 65 supports the roll shaft 68 through the bearings 66 and 67, and it is a bearing in a broad sense. (If the case body 65 bears the roll shaft 68 directly without using the bearings 66 and 67, the case body 65 is an intrinsic bearing (sliding bearing)).

The front portion of the roll shaft 68 is formed with flange mounting surfaces 75 and 76, and flanges 42 and 43 are mounted to the flange mounting surfaces 75 and 76, respectively, with bolts 77 and nuts 78. In the roll locking mechanism 72, a sideways projecting member 79 having a sectorial portion which projects sideways of the roll shaft 68 is serrated (or splined) to the roll shaft 68. A collar 81 is interposed between the bearings 66 and the sideways projecting member 79.

Figure 9:
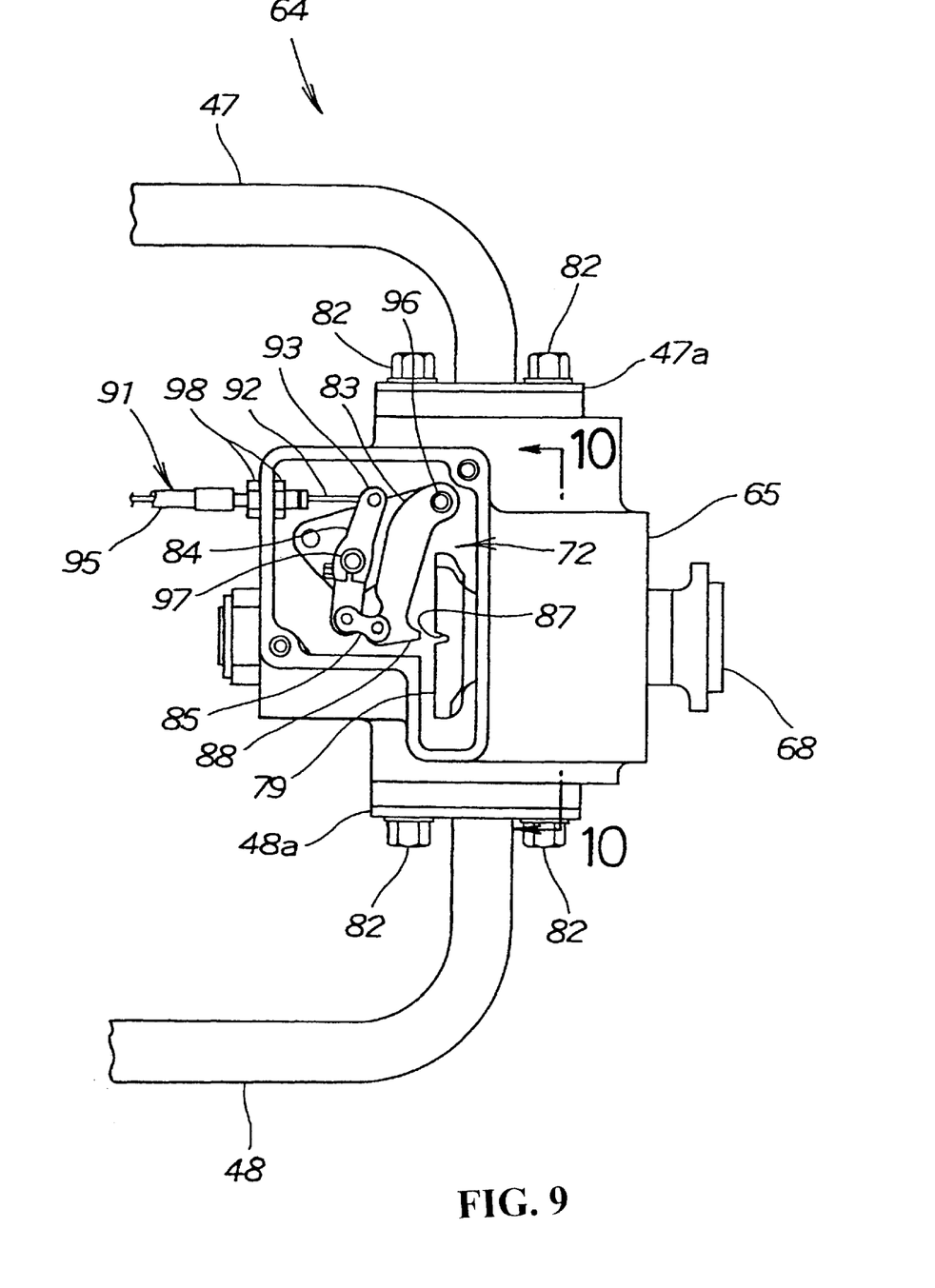
FIG. 9 is a plan view of a joint member in a four-wheeled vehicle according to a further embodiment of the present invention.

FIG. 9 is a plan view of a joint member in the four-wheeled vehicle according to a further embodiment of the present invention, in which a lid provided on top of the joint member 64 is removed. End portions of arms 47 and 48 of the joint member 64 are provided with flanges 47a and 48a, the flanges being secured to side faces of a case body 65 with bolts 82.

A roll locking mechanism 72, which is for locking a relative rotation between a roll shaft 68 and the case body 65, comprises a sideways projecting member 79 secured to the roll shaft 68, a first arm-like member 83 secured to the case body 65 swingably so as to lock the rotation of the sideways projecting member 79. A second arm-like member 84 is secured to the case body 65 swingably so as to push the first arm-like member 83 against the sideways projecting member 79. A link member 85 is interposed between the first and second arm-like members 83, 84.

The sideways projecting member 79 is formed with a groove 87, while the first arm-like member 83 is provided at a front end thereof with a pawl portion 88 for engagement with the groove 87 of the sideways projecting member 79. The second arm-like member is provided at an end portion thereof with a cable mounting portion 93 for mounting an inner cable 92 which constitutes a roll locking cable 91.

The roll locking cable 91 functions as follows to restrict rolling of the vehicle body 11 of the four-wheeled vehicle (see FIG. 1). When the inner cable 92 is pulled by operating an operating lever disposed near the bar handle 12 (see FIG. 1), the pawl portion 88 of the first arm-like member 83 is caught in the groove 87 of the sideways projecting member 79 to lock the rotation of the roll shaft 68 with respect to the case body 65.

The roll locking cable 91, includes an outer tube 95. A swing shaft 96 of the first arm-like member, a swing shaft 97 of the second arm-like member, and a pair of nuts 98 are provided for mounting the roll locking cable 91 to the case body 65.

Figure 10:
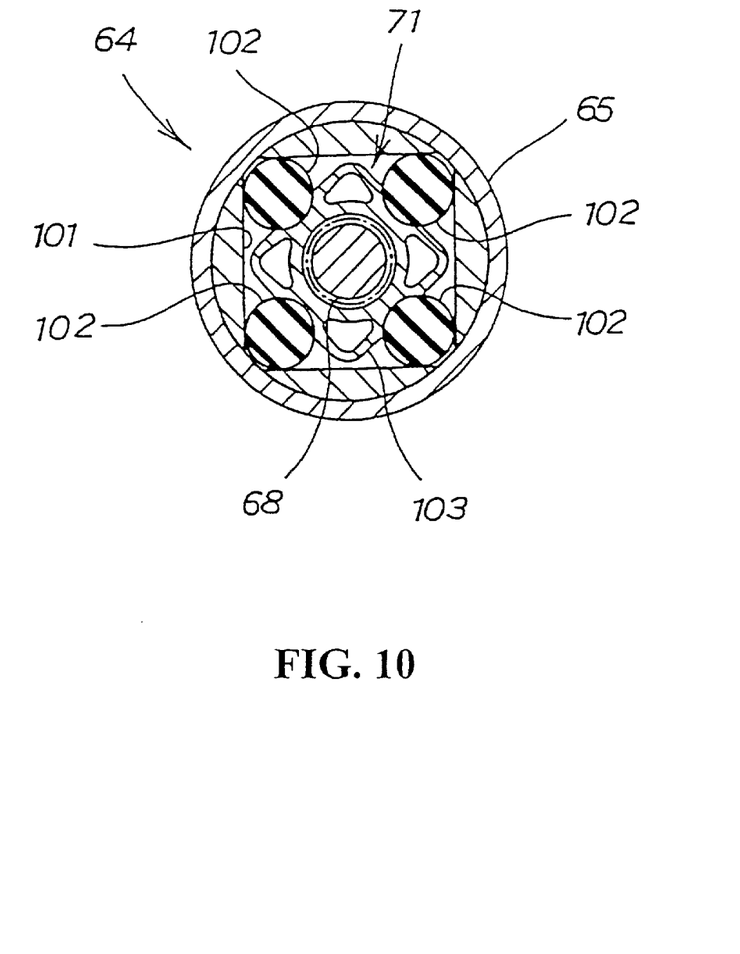
FIG. 10 is a sectional view taken on line 10—10 in FIG. 9.

FIG. 10 is a sectional view taken on line 10—10 in FIG. 9. As illustrated in FIG. 10, a damper 71 used as a component of the joint member 64 comprises an elastic member receiving chamber 101 formed within the case body 65. Elastic members 102 are disposed at four corners of the elastic member receiving chamber 101 (for example, rubber or a soft resin is suitable as the elastic members). A pressing member 103 is disposed inside the elastic members 102 and splined to the roll shaft 68. The damper 71 is what is called a "Neidhart damper" in which as the pressing member 103 rotates together with the roll shaft 68, the pressing member 103 compresses the elastic members 102, thereby giving rise to a damper action.

As described above in connection with FIGS. 8 and 10, the joint member 64 of the present invention is provided with the case body which supports the roll shaft 68 and a damper 71 disposed between the roll shaft 68 and the case body 65. Since the damper 71 is thus disposed between the roll shaft 68 and the case body 65, it is possible to easily adjust the rolling rigidity and rear wheel steering characteristic of the vehicle body 11 (see FIG. 1), whereby the drivability of the four-wheeled vehicle 10 can be improved. Further, since rolling can be locked, when it is not necessary to steer the rear wheels in phase with the front wheels, it is possible to cancel steering of the rear wheels, making it possible to ensure a small turning radius.

The rear wheel suspension system according to the present invention may be of a structure wherein the roll shaft inclination angle α is changed in accordance with the vehicle speed. More specifically, the vehicle speed can be detected by a vehicle speed sensor, and the roll shaft can be tilted by an actuator in accordance with a signal provided from the vehicle speed sensor.

Alternatively, the inclination angle α can be changed in accordance with a steering angle of the front wheels. More specifically, the rotation of the bar handle which steers the front wheels can be transmitted backward by means of a rod through a gear, and change the inclination angle α of the roll shaft by means of a cam attached to a rear end of the rod. Another alternative is for the steering angle of the front wheels to be detected by means of a sensor then tilting the roll shaft by an actuator based on a signal provided from the sensor.

The damper used in the present invention is not limited to a rubber damper which utilizes rubber, but it may be a damper which utilizes fluid such as air or oil. The vehicle to which the invention is applied is not limited to a four-wheeled vehicle, but may be a three-wheeled vehicle comprising two front wheels and one rear wheel. Further, the drive source used as the rear wheel support member in the present invention is not limited to a power unit provided with an engine, but may be an electric motor.

According to the present invention constructed as above there are attained the following effects. According to the rear wheel suspension system in a vehicle of the present invention, since the roll shaft is mounted so that its front end portion is positioned lower than its rear end portion, it is not necessary to mount a heavy object on the rear portion of the vehicle body. This makes it possible to reduce the vehicle weight, distribute the vehicle weight freely, and improve the freedom of vehicle design. Moreover, rear wheel steering rods and rod connecting members, as in the prior art, are not needed. Thus, construction of the rear wheel suspension system is simple, number of components used is reduced, and the vehicle manufacturing cost decreased.

According to the rear wheel suspension system in a vehicle of the present invention, since the joint member is provided with a bearing for supporting the roll shaft and a damper is disposed between the roll shaft and the bearing, it is possible to adjust the rolling rigidity and rear wheel steering characteristic of the vehicle body easily, whereby the vehicle drivability is improved.

According to the rear wheel suspension system in a vehicle of the present invention, since the rear wheel support member is a drive source which uses the rear wheel axles as an output shaft, it is possible to let such a drive source as an engine or an electric motor serve also as a rear swing arm and hence it is possible to reduce the number of components used and reduce the vehicle manufacturing cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear wheel suspension system for a vehicle comprising:
   a joint member mounted on a rear portion of a vehicle body with a pair of right and left front wheels secured thereto, the joint member including a roll shaft extending substantially in a longitudinal direction of the vehicle body, the roll shaft being mounted wherein a front end portion thereof is positioned lower than a rear end portion thereof;
   a vertical swing shaft extending in a transverse direction of the vehicle body;
   a rear wheel support member combined with a power unit for supporting rear wheels; and
   two rear shock absorbers mounted between and connecting the power unit and the vehicle body,
   wherein said rear wheel support member is connected to the rear end portion of said joint member by means of said vertical swing shaft, thereby allowing said rear wheel support member to be secured to the vehicle body rollably and swingably.

2. The rear wheel suspension system in a vehicle according to claim 1, wherein the joint member further comprises:
   two flanges attached to a front end portion of the roll shaft for attaching the joint member to a body frame of the vehicle body;
   an outer case forming a bearing for supporting the roll shaft;
   two arms extending sideways and backwards from the outer case; and
   a bracket attached to a rear end of each of the two arms for mounting the power unit.

3. The rear wheel suspension system in a vehicle according to claim 2, wherein the roll shaft includes a nut threadedly engaged with the rear end portion of the roll shaft and disposed against the end of a collar to prevent dislodgement of the roll shaft from the outer case.

4. The rear wheel suspension system in a vehicle according to claim 2,
   wherein the roll shaft as well as the outer case and the arms rotate relatively with respect to each other; and
   wherein a rightward movement of the rear end portion of the roll shaft causes rear portions of the arms attached to the outer case move rightwards, thereby moving a rear portion of the power unit and rear portions of the rear wheels rightwards.

5. The rear wheel suspension system in a vehicle according to claim 2,
   wherein the roll shaft as well as the outer case and the arms rotate relatively with respect to each other, and
   wherein a leftward movement of the rear end portion of the roll shaft causes rear portions of the arms attached to the outer case move leftwards, thereby moving a rear portion of the power unit and rear portions of the rear wheels leftwards.

6. The rear wheel suspension system in a vehicle according to claim 1, wherein the power unit comprises an engine and a power transferring unit operatively connected to a rear wheel axle as an output shaft.

7. The rear wheel suspension system for a vehicle comprising:

a joint member mounted on a rear portion of a vehicle body with a pair of right and left front wheels secured thereto, the joint member including a roll shaft extending substantially in a longitudinal direction of the vehicle body member;

a vertical swing shaft extending in a transverse direction of the vehicle body;

a rear wheel support member combined with a power unit for supporting rear wheels; and two rear shock absorbers mounted between and connecting the power unit and the vehicle body;

wherein said rear wheel support member is connected to a rear portion of said joint member by means of said vertical swing shaft, thereby allowing said rear wheel support member to be secured to the vehicle body rollably and swingably, and wherein the joint member is provided with two arms extending sideways and backwards from a case of the roll shaft; and a bracket attached to a rear end of each of the two arms for mounting the rear wheel support member.

8. The rear wheel suspension system in a vehicle according to claim 7, wherein the joint member further comprises:

a roll shaft with a front end portion and a rear end portion;

two flanges attached to a front end portion of the roll shaft for attaching the joint member to a body frame of the vehicle body;

a bearing for supporting said roll shaft;

a damper disposed between said roll shaft and said bearing; and a locking mechanism for locking a relative rotation between the roll shaft and the case.

9. The rear wheel suspension system in a vehicle according to claim 7, wherein said a front end portion is positioned lower than a rear end portion of the roll shaft.

10. The rear wheel suspension system in a vehicle according to claim 7, wherein the roll shaft includes a nut threadedly engaged with a rear end portion of the roll shaft to prevent dislodgement of the roll shaft from the case.

11. The rear wheel suspension system in a vehicle according to claim 7, wherein the roll shaft as well as the case and the arms rotate relatively with respect to each other, and wherein a rightward movement of the rear end portion of the roll shaft causes rear portions of the arms attached to the case move rightwards, thereby moving a rear portion of the power unit and rear portions of the rear wheels rightwards.

12. The rear wheel suspension system in a vehicle according to claim 7, wherein the roll shaft as well as the outer case and the arms rotate relatively with respect to each other, and wherein a leftward movement of the rear end portion of the roll shaft causes rear portions of the arms attached to the outer case move leftwards, thereby moving a rear portion of the power unit and rear portions of the rear wheels leftwards.

13. The rear wheel suspension system in a vehicle according to claim 7, wherein the power unit comprises an engine and a power transferring unit operatively connected to a rear wheel axle as an output shaft.

* * * * *